Nov. 8, 1932.    J. GABLI    1,886,668

DIFFERENTIAL DRIVE MECHANISM

Filed Dec. 14, 1931

INVENTOR
Jacob Gabli

BY

ATTORNEYS

Patented Nov. 8, 1932

1,886,668

UNITED STATES PATENT OFFICE

JACOB GABLI, OF LINCOLN PARK, MICHIGAN

DIFFERENTIAL DRIVE MECHANISM

Application filed December 14, 1931. Serial No. 580,789.

The present invention relates to improvements in differentials adapted for use in automobiles, trucks or other vehicles wherein the driving power is transmitted to all four wheels.

The primary object of the present invention is to provide a differential that may be conveniently located between the drive shaft of the motor and the propeller shafts that extend to the front and rear axles so that the two axles may rotate at different speeds relative to each other under certain conditions in the operation of the vehicle. The propeller shafts are preferably connected to the differential by universal joints which are located outside the differential casing which is constructed in a manner to permit the mechanism therein to operate in oil or other lubricant.

With the above and other ends in view the invention consists in matters hereinafter set forth and more particularly pointed out in the appended claims, reference being had to the accompanying drawing, in which Figure 1 is a plan view of the front and rear axles connected to the present differential;

Like characters of reference are employed throughout to designate corresponding parts.

Figure 1:
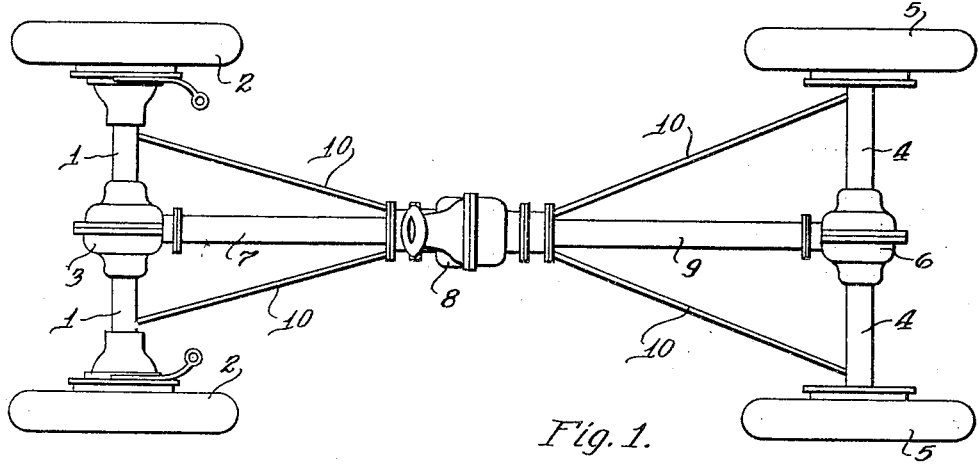
Figure 2:
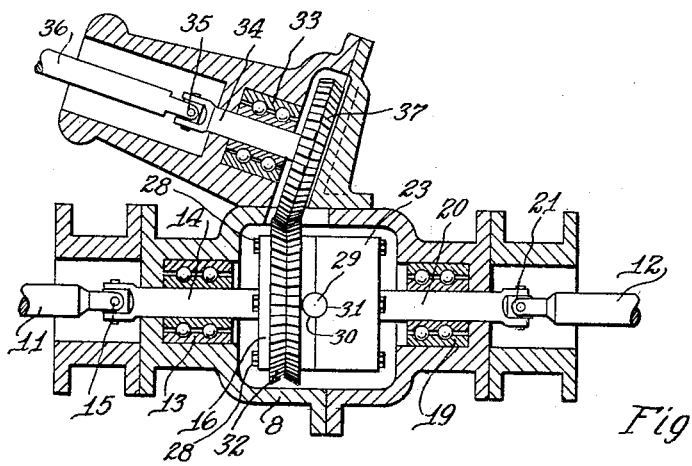
Fig. 2 is a cross sectional view, partly in side elevation.

The numeral 1 indicates the front axle housing of an automobile or other motor vehicle having wheels 2 pivotally mounted thereon for steering purposes. 3 indicates the differential casing which encloses a conventional differential which is connected to the front wheels in a manner to drive the same. The rear axle housing 4 supports the usual wheels 5 and is provided with a differential housing 6 which contains the usual differential. A housing 7 connects the front differential housing 3 to the differential casing 8 and the housing 9 connects the rear axle differential to the differential casing 8.

Radius rods 10 connect the differential casing 8 to the axle housings 1 and 4 at points remote from the centers of the latter. Within the housing 7 is mounted a propeller shaft 11 and within the housing 9 is mounted a propeller shaft 12 and these two shafts are adapted to drive the front and rear axles respectively.

Figures 3, 4:
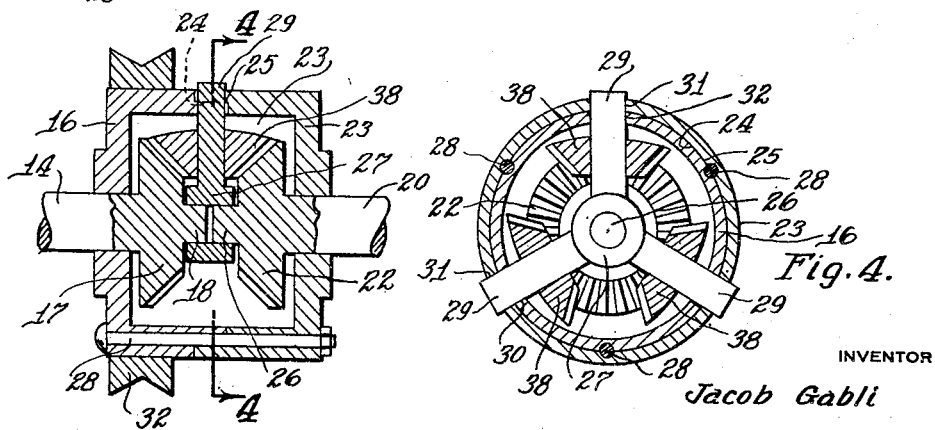
Fig. 3 is a cross sectional view illustrating the differential connection between the two propeller shafts.
Fig. 4 is a transverse cross sectional view taken along the line 4—4 of Fig. 3.

The differential casing 8 is provided at one end with a bearing 13 in which is mounted a stub shaft 14 that is connected to the propeller shaft 11 by means of a universal joint 15. Mounted on the stub shaft 14 is a cylindrical casing 16 and formed integral with the shaft 14 and located inside the casing 16 is a bevelled gear 17. Projecting outwardly from the face of the gear 17 is a stub shaft 18. In the opposite end of the differential casing 8 is mounted a bearing 19 that supports a stub shaft 20 that is connected to the propeller shaft 12 by a universal joint 21. The inner end of the shaft 19 has a bevelled gear 22 formed thereon and enclosed by a cylindrical casing 23 that is loosely mounted on the shaft 20. As indicated in Fig. 3 the cylindrical casing 16 has a reduced diameter at 24 and the casing 22 is provided with a counter bore 25 to receive the reduced diameter so that the two casings 16 and 23 combine to form a closed cylindrical casing. Projecting outwardly from the face of the gear 22 is a stub shaft 26 that is concentric with the stub shaft 18.

A spider 27 is mounted on the two stub shafts 18 and 26 when the same are held in the relation illustrated in Fig. 3 by the two cylindrical casings 16 and 23 when the casings are held together by bolts 28. The projecting members 29 that extend outwardly in a radial manner relative to shafts 18 and 26 are received in recesses 30 and 31 that are formed in the meeting edges of the cylindrical members 16 and 23 respectively. Mounted on the outer periphery of the cylindrical casing 16 is a ring gear 32.

A bearing 33 is provided in the upper portion of the differential casing 8 and supports a shaft 34 that is connected by a universal joint 35 to a shaft 36 that represents the drive shaft of an internal combustion or other engine. On the inner end of the shaft 34 is a gear 37 that meshes with the gear 32. It will be noted that the ring gear 32 has an outer periphery that is concaved in the nature of a V and the gear 37 is convexed in the same manner to fit therein.

To establish a driving connection between the two shafts 14 and 20 there are provided bevelled gears 38 on the shafts 29 that are part of the spider 27, the spider being held by the stub shafts 18 and 26 and by the recesses in the casings 16 and 23 so that the gears 38 mesh with the gears 17 and 22.

In operation the drive shaft 36 rotates the gear 37 which in turn rotates the cylindrical casings 16 and 23 by means of the gear 32. The two casings rotate the spider 27 which carries the gears 38. As long as the resistance against rotation of both shafts 11 and 12 is equal the same will be rotated at the same speed in the same direction but should the resistance become greater on one shaft than on the other the two may rotate at different speeds.

Although a specific embodiment of the present invention has been illustrated and described it is to be understood that various changes may be made in the details of construction without departing from the spirit of the invention as set forth in the appended claims, and such changes are contemplated.

What I claim is:

1. A differential driving mechanism for four wheel drive vehicles comprising a hollow casing, a pair of shafts co-axially supported in opposite ends of said casing and adapted to be connected to the front and rear axles respectively of a vehicle, cup-like members mounted on the inner ends of said shafts and bolted together to form a closed cylindrical casing, said cup-like members having corresponding recesses formed in their meeting edges which form circular openings when said members are bolted together, bevelled gears formed integral with said shafts, stub shafts projecting outwardly from the inner face of said gears, a spider mounted on said stub shafts and having radial arms received in said circular recesses, bevelled gears on said radial arms meshing with said first named bevelled gears, a ring gear mounted on said cylindrical casing, said hollow casing having an opening in its upper wall, a drive shaft supported adjacent said opening with its axis angularly inclined relative to the axis of said first named shafts, and a gear on said drive shaft meshing with said ring gear.

2. A differential driving mechanism for four wheel drive vehicles comprising a hollow casing, a pair of shafts co-axially supported in opposite ends of said casing and adapted to be connected to the front and rear axles respectively of a vehicle, cup-like members mounted on the inner ends of said shafts and bolted together to form a closed cylindrical casing, said cup-like members having corresponding recesses formed in their meeting edges which form circular openings when said members are bolted together, bevelled gears formed integral with said shafts, stub shafts projecting outwardly from the inner face of said gears, a spider mounted on said stub shafts and having radial arms received in said circular recesses, bevelled gears on said radial arms meshing with said first named bevelled gears, a ring gear mounted on said cylindrical casing, said hollow casing having an opening in its upper wall, a drive shaft supported adjacent said opening with its axis angularly inclined relative to the axis of said first named shafts, and a gear on said drive shaft meshing with said ring gear, said ring gear having teeth formed in a V-shaped peripheral groove, and said drive shaft gear having teeth formed to project outwardly in V-shaped manner whereby they are received in said V-shaped peripheral groove.

In testimony whereof I affix my signature.

JACOB GABLI.